Dec. 6, 1932.  A. L. FREEDLANDER  1,890,082
LINE CONTACT BELT
Filed Aug. 5, 1929   2 Sheets-Sheet 1

INVENTOR
ABRAHAM L. FREEDLANDER.
BY
ATTORNEY

Dec. 6, 1932.                A. L. FREEDLANDER            1,890,082
                              LINE CONTACT BELT
                            Filed Aug. 5, 1929        2 Sheets-Sheet 2

INVENTOR
ABRAHAM L. FREEDLANDER.
BY
ATTORNEY

Patented Dec. 6, 1932

1,890,082

UNITED STATES PATENT OFFICE

ABRAHAM L. FREEDLANDER, OF DAYTON, OHIO

LINE CONTACT BELT

Application filed August 5, 1929. Serial No. 383,757.

My invention relates to a transmission belt.

It is the object of my invention to provide a belt which engages with a pulley on the sides of the belt on a line as distinguished from a driving surface heretofore employed. For driving purposes a contact on a line is the ideal condition provided a belt of sufficient rigidity for line contact without slipping could be secured.

It is another object of my invention to provide a belt which has a rigid cross section member, the outer end of which forms a line contact with the sides of the groove of the pulley; and in combination therewith an inextensible belt structure for maintaining the line contact and for carrying the load.

It is a further object to provide such a structure for line contact in combination with a neutral inextensible axis, a compression area and extension area and a rigid line contact plate of material.

It is my object to provide a line contact belt which may be either a continuous line or intermittent points laid out on the same line, as in a cog belt.

It is a further object to provide a belt of lesser size for a given capacity of load, a belt that will remain cooler with better ventilation and less friction for the generation of heat.

Referring to the drawings:—

Figure 1:
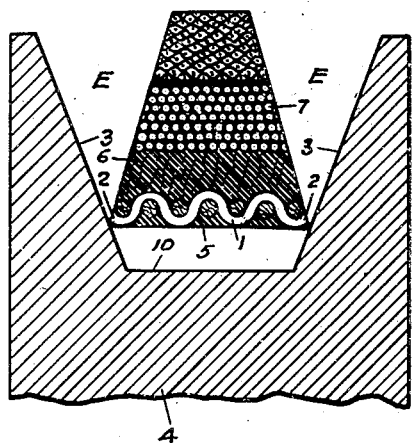
Fig. 1 is a section through a portion of a groove pulley and the belt having the line contact.
Figure 2:
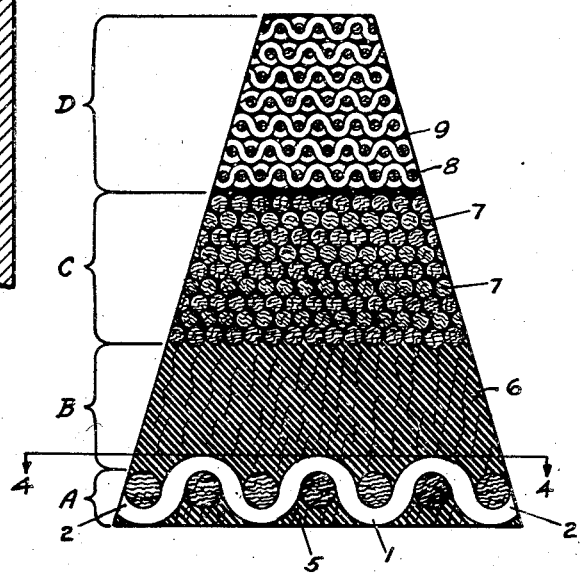
Fig. 2 is an enlarged section therethrough.
Figure 3:
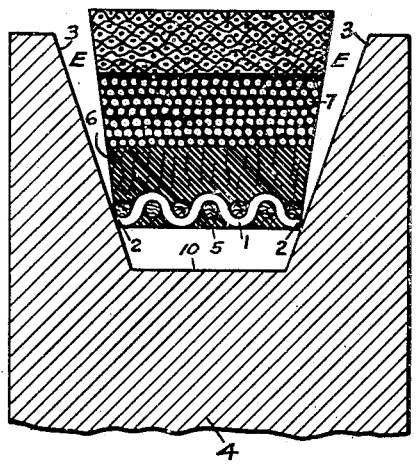
Fig. 3 is the modified form of the section.
Figure 4:
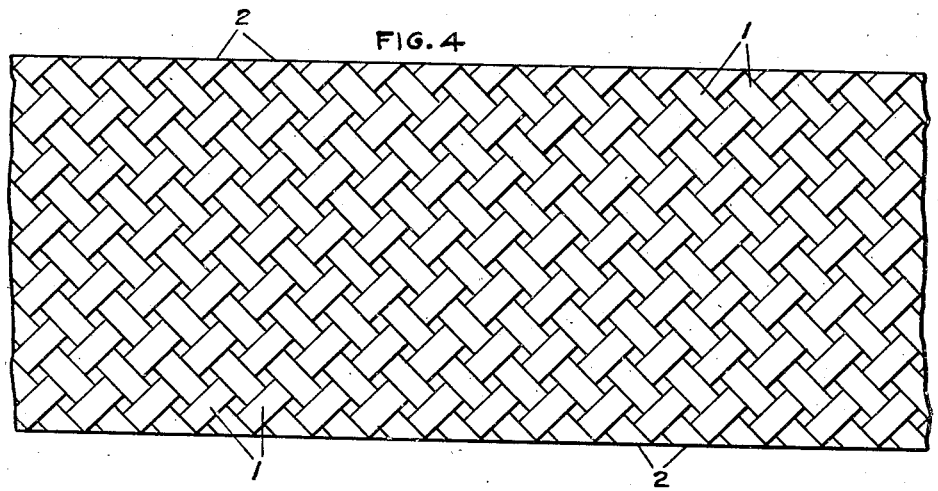
Fig. 4 is a section on the line 4—4 with the stiflex removed.
Figure 5:
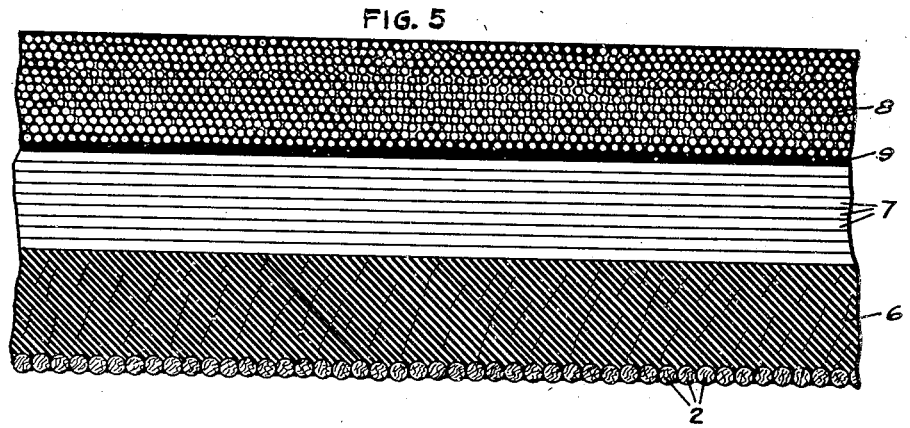
Fig. 5 is a side elevation of a continuous line contact belt.
Figure 6:
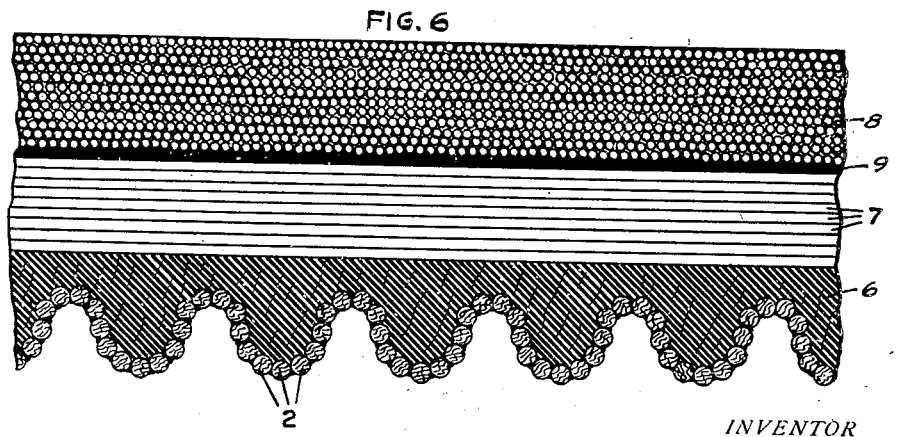
Fig. 6 is the side elevation of a discontinuous line contact belt.

Referring to the drawings in detail, it will be realized that the drawings are necessarily diagrammatic. In practice the stiff line contact member hereinafter described shown at the bottom of the belts directly engages at the ends with the side walls of the pulley. In the drawings due to the showing in enlarged form of a rubber skim it looks as if this rubber did the engaging with the pulley but this is not the case, as this rubber quickly wears away and the line contact is the rigid member designated 1, the ends of which 2 provide a raw edge line contact which is the driving line between the side walls 3 of the pulley 4 and the belt. The rubber skim is designated 5.

This rigid transverse member is composed of a very heavy fabric such as $17\frac{1}{4}$ ounce material which is substantially rigid transversely but is flexible as it passes around the pulley, such flexibility being transverse of the belt. The fabric 1 is cut on the bias in order to increase the rigidity and strength.

Above this rigid structure is a rubberized fiber compound known as stiflex designated 6. Above the stiflex compression section is the continuous neutral axis section composed of rubberized cords 7 which are wound continuously. Above the neutral axis section 7 are a plurality of continuously wound layers of light fabric 8 imbedded in rubber 9 comprising an extension section.

Thus the belt is formed of a line contact driving section A, a compression section B, a neutral axis section C and an extension section D. It will be understood that the overall dimension longitudinally of the belt does not stretch as it is prestretched during manufacturing, is vulcanized in the prestretched condition and maintained in such condition by the cords 7 which are inextensible.

The belt is mounted approximately at $\frac{3}{16}$ of an inch above the bottom 10 of the pulley groove so that there will be no contact between the bottom of the belt and the bottom of the pulley groove. This line contact of the ends 2 with the side walls 3 throws the load into the region of the neutral axis C which is adapted to take the load. The stiff plate of material 1 is so rigid and the end contact of the ends 2 is so secure against the faces 3 that there is no slipping. By having a very material space designed as E between the side walls of the belt and the side 3 of the groove pulley free and complete ventilation is secured.

It will be understood that I desire to comprehend within my invention and within the scope of my claims such modifications as may be fairly comprehended within such claims and invention due to necessary modifications to adapt my invention to varying conditions of use and to varying purposes.

Having thus fully described my invention, what I claim as new and desire to secure by Letters Patent, is:

1. In combination, a groove pulley and a belt therein having a rigid layer engaging said pulley substantially along a single line on each pulley surface, said belt having raw ends arranged in a line for forming the line contact.

2. In combination, a groove pulley and a belt therein having a rigid layer engaging said pulley substantially along a single line on each pulley surface, said belt having raw ends arranged in a line for forming the line contact, the body of the belt being located above said line.

3. In combination, a groove pulley and a belt therein having a rigid layer engaging said pulley substantially along a single line on each pulley surface, said belt having raw ends arranged in a line for forming the line contact, the body of the belt being located above said line and spaced from the side walls of the pulley groove.

4. In combination, a groove pulley and a belt therein having a rigid layer engaging said pulley substantially along a single line on the pulley surface, said belt having raw ends arranged in a line for forming the line contact, the body of the belt being located above said line and spaced from the side walls of the pulley groove, said body of the belt also being remote from the body of the pulley groove.

5. In combination, a V-shaped groove pulley, a belt mounted therein above the bottom of the groove of the pulley, said belt having a rigid layer engaging with the pulley groove side walls on each pulley surface substantially along a line, the remainder of the walls of the belt being above said line contact and removed from the walls of the groove.

6. In combination, in a belt of an inflexible driving member having raw edges adapted to make substantially line contact on its edges with the walls of a groove pulley on each pulley surface and a body member for said belt associated therewith but out of contact with the side walls of the pulley.

7. In combination, in a belt of an inflexible driving member having raw edges adapted to make substantially line contact on its edges with the walls of a groove pulley on each pulley surface and a body member for said belt associated therewith but out of contact with the side walls of the pulley, said body member comprising an inextensible neutral axis portion.

8. In combination, in a belt of an inflexible driving member having raw edges adapted to make substantially line contact on its edges with the walls of a groove pulley on each pulley surface, a body member for said belt associated therewith but out of contact with the side walls of the pulley, said body member comprising an inextensible neutral axis portion, and a compression portion.

9. In a belt, a very heavy fabric inner layer, the fiber ends of which engage the side walls of the pulley substantially on a line and a combined rubber and textile body located in pyramidical form above said fabric.

10. In combination, a pulley having a groove of trapezoidal section with the small part adjacent the axis of the pulley, and a belt of vulcanized rubber and fabric of trapezoidal section with the larger base on the inside.

11. In combination, a pulley having a groove of trapezoidal section with the small part adjacent the axis of the pulley, and a belt of vulcanized rubber and fabric of trapezoidal section with the larger base on the inside, said fabric in the belt extending to the edge forming a raw-edge driving surface.

In testimony whereof, I affix my signature.

ABRAHAM L. FREEDLANDER.